Figure 1:
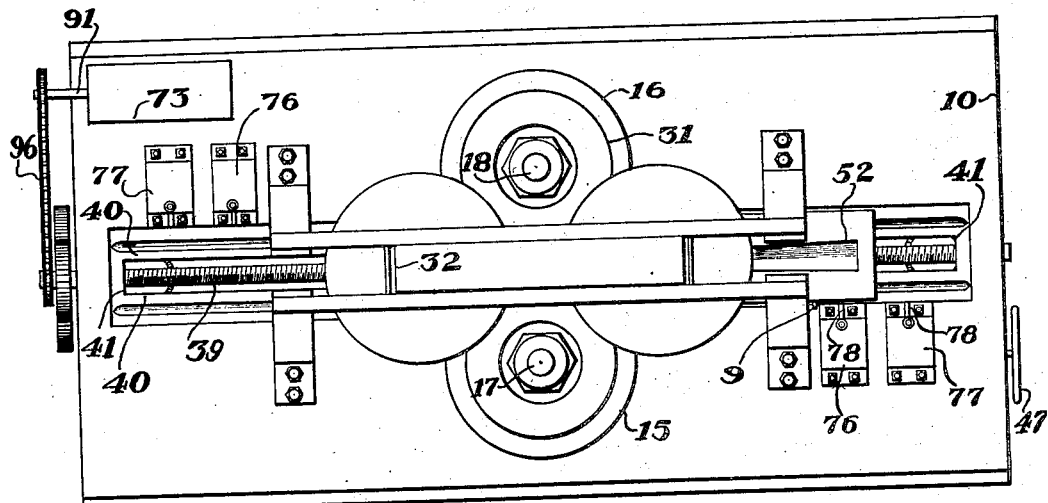

June 24, 1930. H. P. SAILOR 1,766,229
APPARATUS FOR WELDING HOLLOW METALLIC ARTICLES
Filed July 6, 1926 7 Sheets-Sheet 1

INVENTOR.
Horace P. Sailor
BY
Bates Macklin Folnick Peere
ATTORNEYS

June 24, 1930.  H. P. SAILOR  1,766,229
APPARATUS FOR WELDING HOLLOW METALLIC ARTICLES
Filed July 6, 1926   7 Sheets-Sheet 3

INVENTOR.
Horace P. Sailor
BY
ATTORNEYS

June 24, 1930.    H. P. SAILOR    1,766,229
APPARATUS FOR WELDING HOLLOW METALLIC ARTICLES
Filed July 6, 1926    7 Sheets-Sheet 4
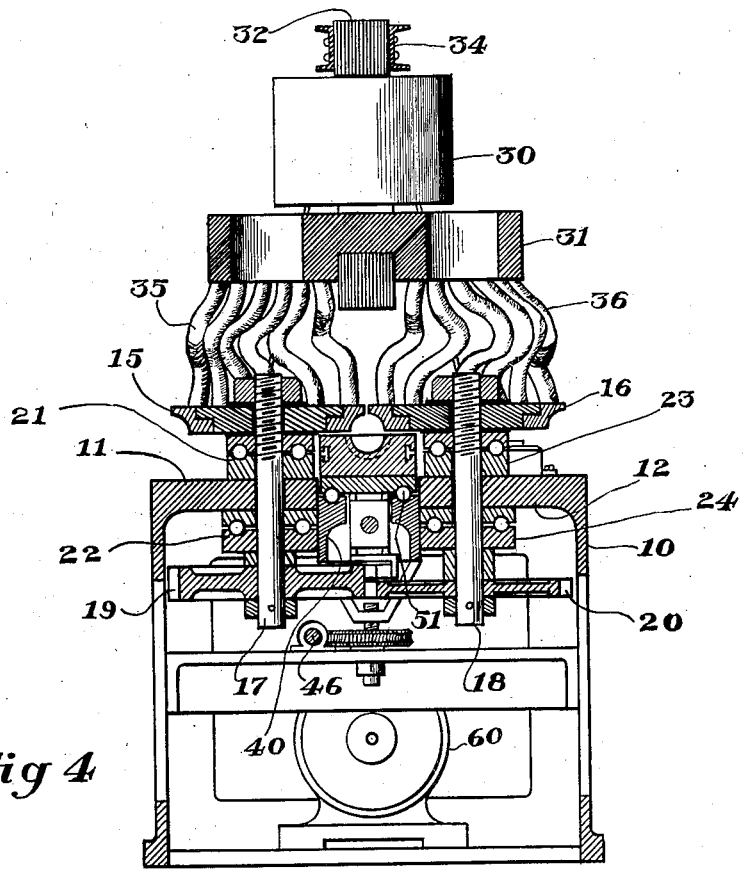
Fig 4
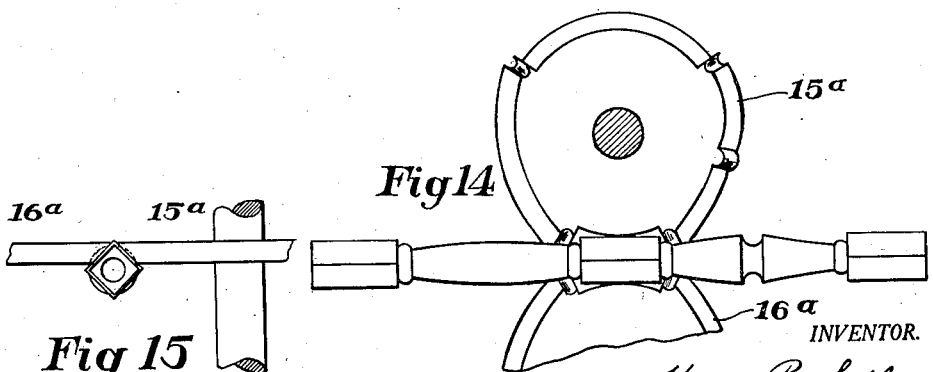
Fig 14
Fig 15
INVENTOR.
Horace P. Sailor
BY
ATTORNEYS

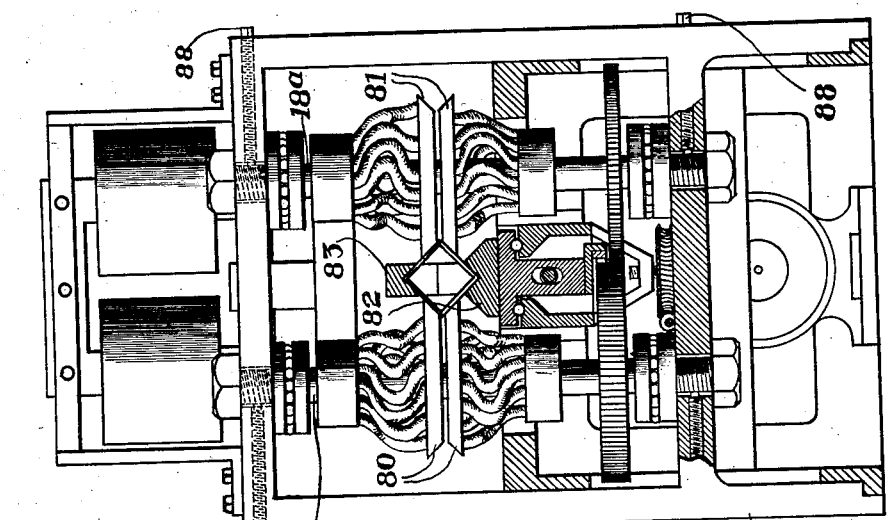
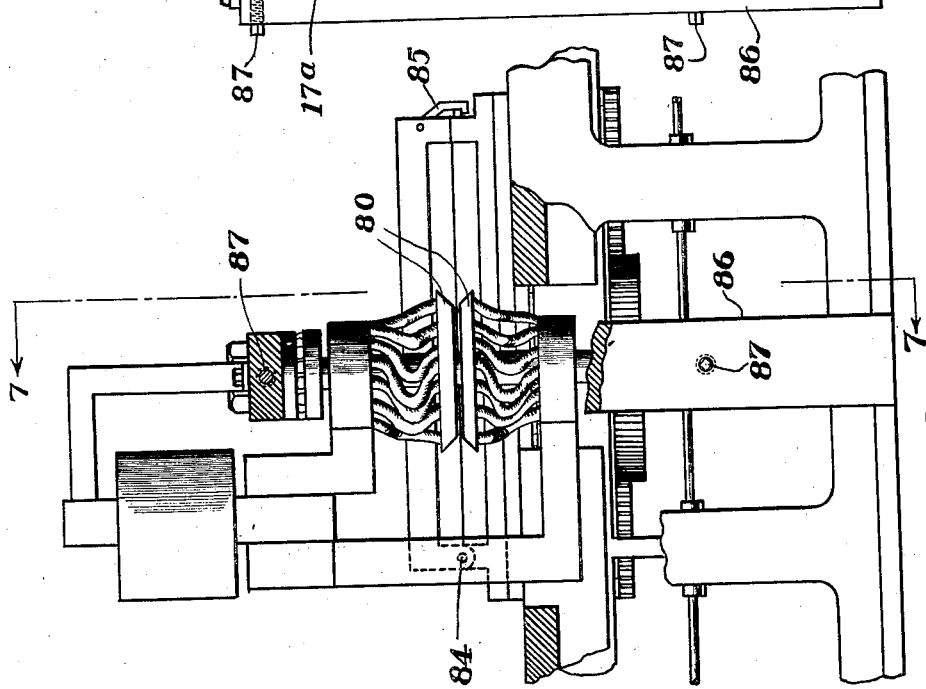

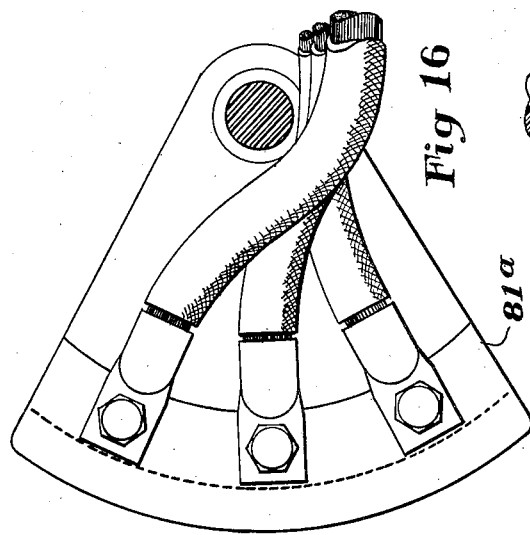
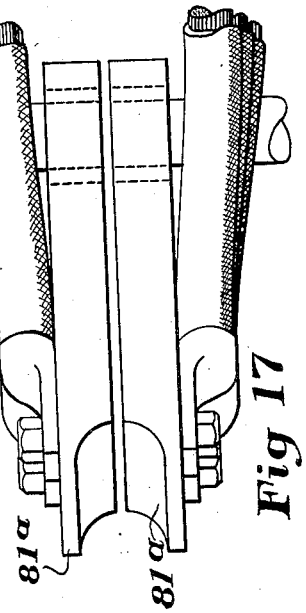
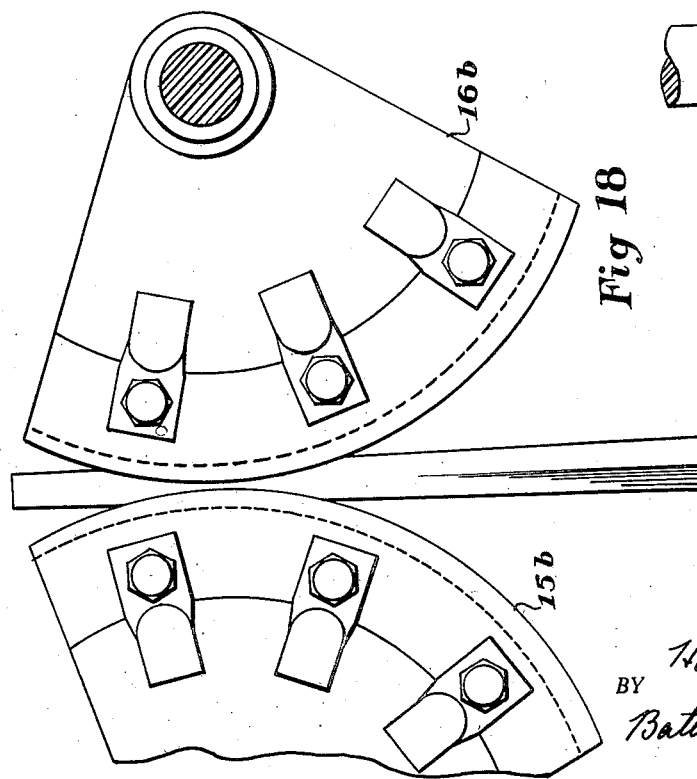
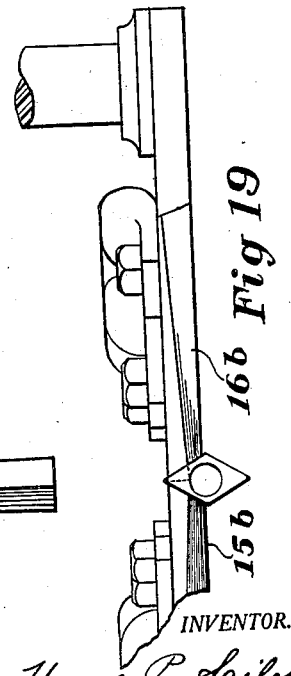

Patented June 24, 1930

1,766,229

UNITED STATES PATENT OFFICE

HORACE P. SAILOR, OF CLEVELAND, OHIO

APPARATUS FOR WELDING HOLLOW METALLIC ARTICLES

Application filed July 6, 1926. Serial No. 120,567.

This invention relates to electric welding machines and is particularly concerned with a method and apparatus for welding articles having an irregular shape such as metal furniture, automobile parts and the like. Heretofore, electric welding as practiced on a large scale in the manufacture of hollow articles having an irregular shape, has been limited to the flame or torch welding, and to spot welding.

Articles having a regular, or uniform, shape have been electrically welded by passing them in a straight line path between rotatable electrodes and such practice has developed to such an extent that tubing (having uniform diameter throughout the length) can be welded satisfactorily at a speed of over sixty feet per minute. Operating conditions prevent the use of such apparatus for electrically welding irregularly shaped hollow articles, since the electrodes must maintain close contact with the work at all times during the welding operation. This cannot be done where irregularly shaped members are passed between rotating electrodes which are uniformly curved on the periphery and rotate on fixed axes. On the other hand with the use of spot welding apparatus only lap joints can be made. It is desirable, however, to effect a weld of irregularly shaped articles by a butt weld. Flame welding is comparatively slow and causes a large flash or fin as well as a deleterious effect on the grain structure of the metal. A further difficulty which arises in connection with the operation of present tube welding machines, is the use of brush contacts in the secondary circuit. These contacts must be removed and dressed to assure satisfactory contact and to cure the damage from arcing. To eliminate the difficulties inherent in the use of brush contacts, one practice has been to employ fluid contacts such as mercury, but this is restricted only to cases where the electrodes occupy a certain position. Usually this position necessitates rotation of the electrodes upon a vertical axis.

One of the objects of the present invention is to provide a method for making hollow metallic irregularly-shaped articles by electrically welding them in such manner that a speed approximating that used for electrically welding tubing can be obtained. Moreover, my invention contemplates a method which is applicable to hollow articles having irregularly shaped seams. In addition, my invention is directed toward the provision of apparatus for enabling such method to be carried out in a satisfactory manner.

A further object of my invention is to make a connection in the secondary circuit for obviating the necessity of using either sliding or fluid contacts. In this way I completely avoid the objectionable arcing in the secondary circuit and minimize electrical contact losses.

Figure 13:
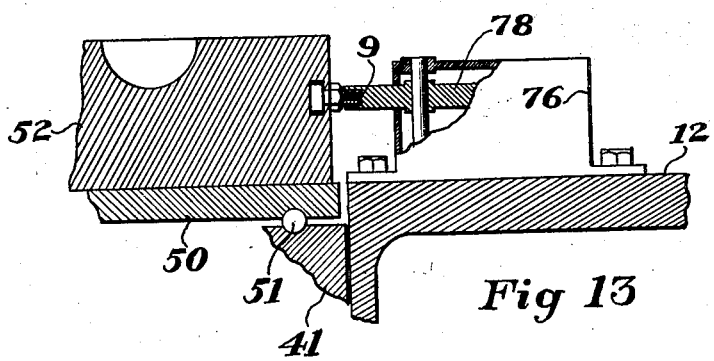
Figure 2:
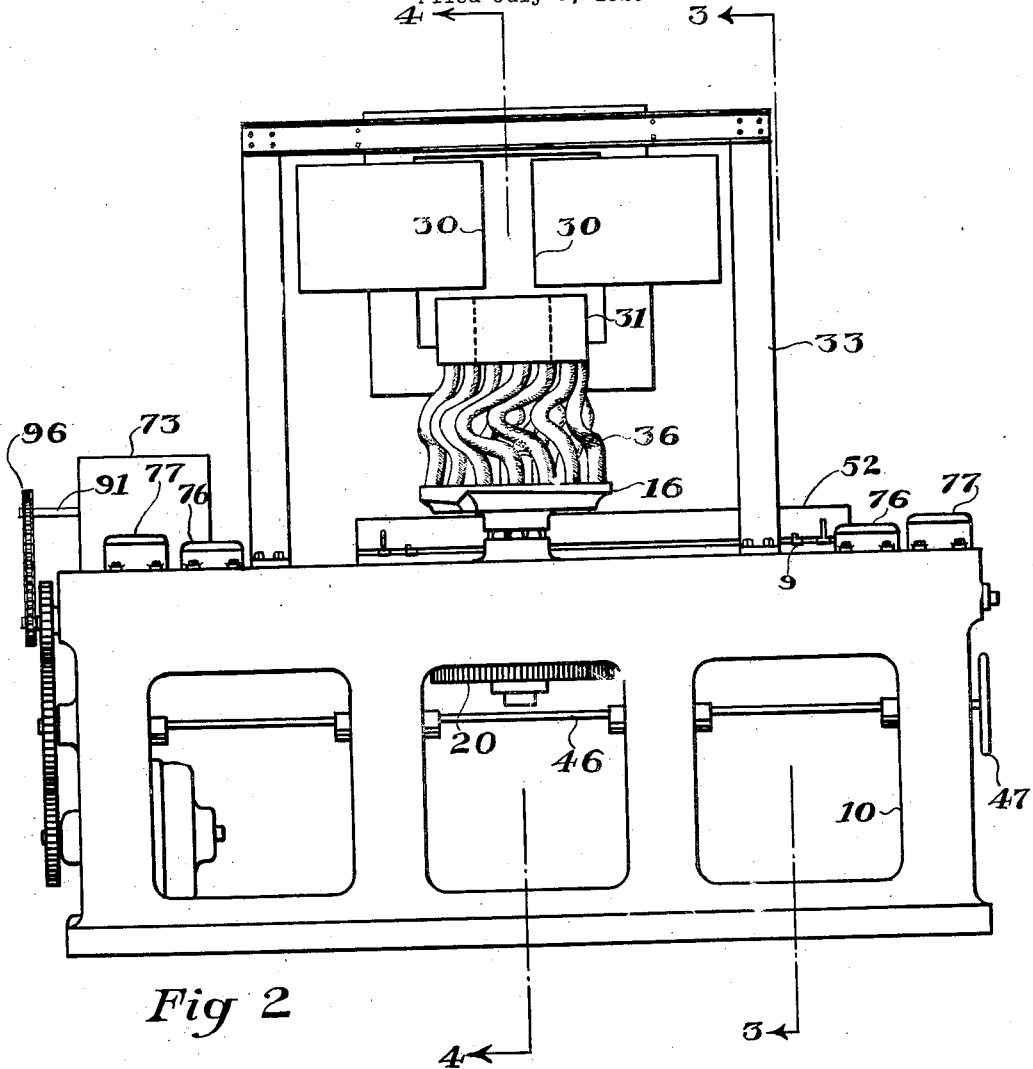
Figure 3:
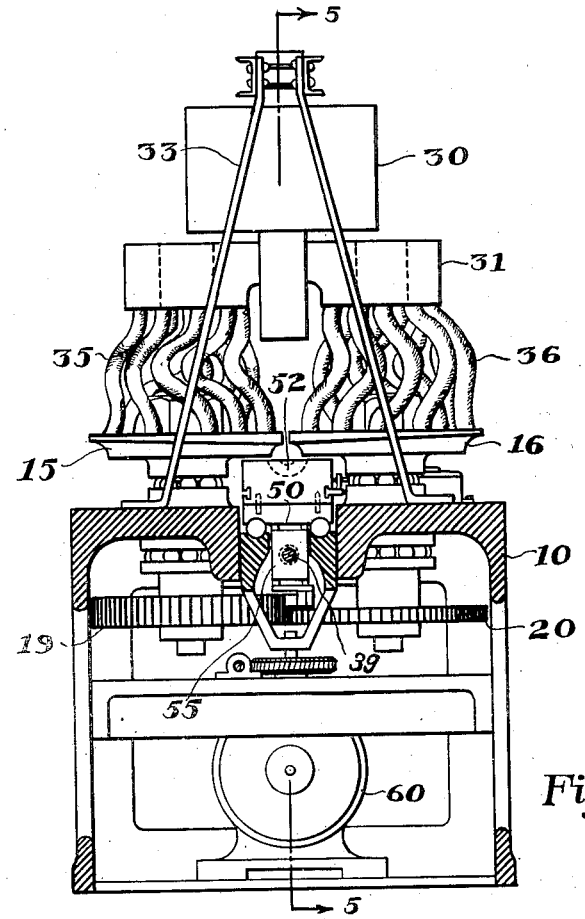
Figure 5:
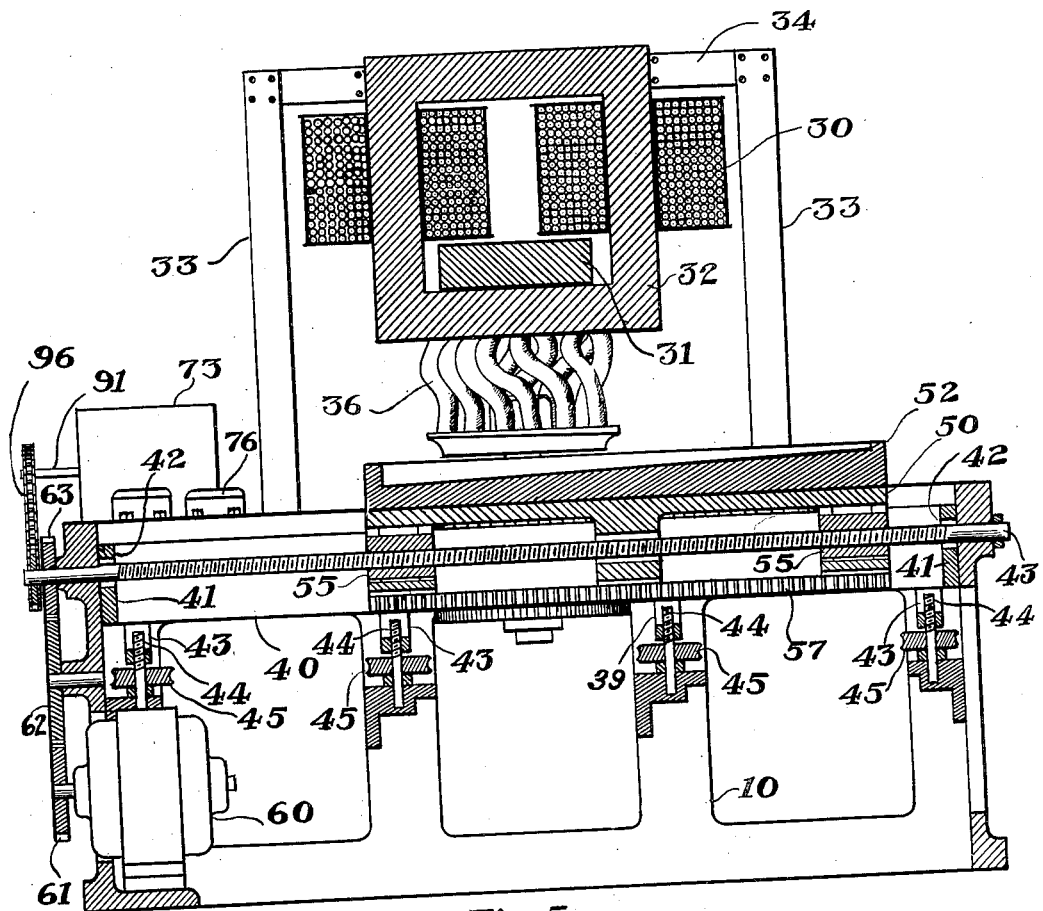
Figure 8:
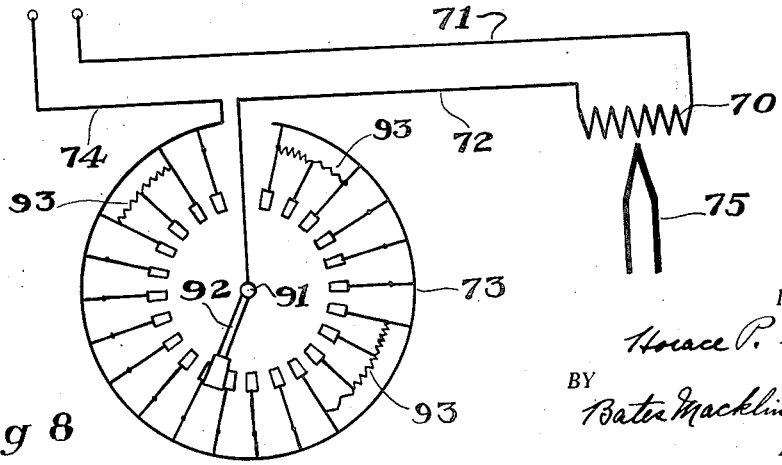

In the drawings, I have illustrated apparatus by means of which my invention may be accomplished. More particularly, Fig. 1 shows a plan view of my electric welding machine; Fig. 2 is a side elevation of the machine; Figs. 3 and 4 are transverse sections taken through the machine on planes indicated by the correspondingly numbered lines in Fig. 2; Fig. 5 is a longitudinal vertical section taken through the machine on a plane indicated by the line 5—5 in Fig. 3; Fig. 6 is a side elevation of a modified form of apparatus by means of which my invention may be accomplished; Fig. 7 is a transverse section through the machine shown in Fig. 6 taken on a plane indicated by the line 7—7 in Fig. 6; Fig. 8 is a wiring diagram; Figs. 9, 10, 11 and 12 are detail views showing the construction of the work holder and carriage; Fig. 13 is an enlarged detail sectional view showing a part of the means for actuating the circuit controller; Fig. 14 is a bottom plan showing the relation of the electrodes to a particular form of article to be welded; Fig. 15 is an end elevation of the cooperating electrodes and article shown in Fig. 14; Fig. 16 is a plan view through a modified form of double electrodes; Fig. 17 is a side elevation of the electrodes shown in Fig. 16; Fig. 18 is a top plan view of a modified form of single electrode construction with an article being welded shown therebetween; Fig. 19 is a side elevation of the electrodes shown in Fig. 18.

Referring now to Figs. 1 to 5, 10 indicates a bed frame having longitudinally extending inwardly projecting guides 11 and 12 adjacent the top thereof. Within the frame I provide means for actuating rotatable electrodes, and also for moving the work with relation to the electrodes during the welding operation. The electrodes are indicated at 15 and 16 as being mounted upon vertically extending shafts 17 and 18 respectively and as being operatively connected by gears 19 and 20 respectively. These gears have the same number of teeth so as to effect uniform rate of rotation. Ball thrust bearings 21 and 22 are shown as being associated with the shaft 17 and as being positioned above and below the projection 11 respectively. In like manner ball thrust bearings 23 and 24 are illustrated in connection with the shaft 18.

The transformer which may be used in connection with my welding machine is similar to those used in connection with electric tube welding apparatus, and is shown as having a primary 30, a secondary 31 with an associated core 32. The transformer is supported preferably above the bed frame by end beams 33 and longitudinally extending beams 34. The single turn secondary embodies a copper casting 31, flexible conductors 35 and 36 respectively and the electrodes.

My invention is carried out by passing the work to be welded between the electrodes at a speed which is dependent upon the kind and gauge of metal being welded. In order therefore to maintain proper electrical contact with the work, I shape the contacting edges or surfaces of the electrodes to conform to the shape of the article along the seam, so as to maintain substantially the same pressure and contacting engagement at all points along the article on opposite sides of the seam cleft, while the electrodes rotate upon fixed axes and while the work moves in a straight line path between the electrodes. Thus, each article to be welded will necessitate specially formed electrodes having irregular or warped contacting edges and particular positioning of the electrodes with relation to the work holder to insure proper contact at all times during the welding operation. Ordinarily the electrodes must be of sufficient size, that the entire length of the article can be traversed within one revolution, while the flexible conductors have sufficient length to permit such rotation to be accomplished. In some instances, particularly on comparatively short articles, the electrodes may be circular segments as shown in Figs. 16 and 18, but in every case the contour of the contacting edge is what might be termed negative with respect to the shape of the article being welded. In other cases the electrodes may rotate more than a complete revolution so as to duplicate the welding operation on the same piece of metal.

To move the work between the electrodes, I have shown a hollow rectangular frame having side beams 40 and end beams 41 which connect the side beams adjacent the ends thereof, and are provided with apertures as at 42 to admit a screw shaft 39. The side beams extend substantially the entire length of the bed frame and are positioned between the projecting portions 11 and 12 as shown in Fig. 4. Moreover, this frame is adapted to be raised vertically for controlling the pressure between the work and the electrodes, and to this end I have shown spaced yokes 43 which are threaded to receive correspondingly threaded shafts 44 which in turn are rigidly mounted upon worm wheels 45. These wheels may be simultaneously actuated upon operation of a worm shaft 46 which carries a worm adjacent each worm wheel and which may be manually operated by a hand wheel 47 from a point outside and adjacent one end of the bed frame.

A carriage 50 is mounted as at 51 to slide upon the vertically shiftable frame and is adapted to carry a removable work holder 52. The work holder may be fastened as by dowel pins 53, so as to facilitate removal and substitution of a differently shaped holder for enabling another article to be welded. Thus the length and shape of the work holder as well as the shape of the contacting surface of the electrode must be varied in accordance with the shape of the article being welded.

Figures 9, 10, 11, 12:
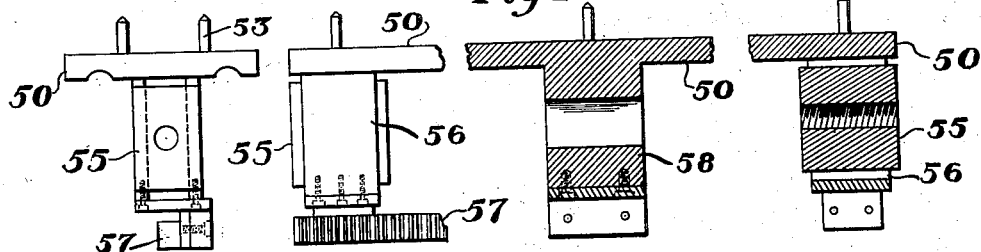

To move the carriage longitudinally of the frame and at the same time to permit a slight vertical movement for adjusting the degree of pressure between the work and the electrodes, I have shown a plurality of nut members 55 which are threaded to engage the screw shaft 39, and which are movable vertically in guides 56. These guides are shown as spaced members which depend from the carriage and which carry a rack 57 beneath the lower end thereof. The nut members are preferably spaced at each end of the carriage, while a central apertured arm 58 shown in Fig. 5 is arranged to depend from the carriage and to assist, as shown in Fig. 11, in holding the rack rigidly in position.

The screw shaft may be rotated in any suitable way. To this end I have shown a motor 60 beneath the bed frame which is connected as by gears 61, 62 and 63 to the screw shaft to rotate it at the desired speed. Such rotation of the shaft effects longitudinal movement of the carriage, and since the rack is in mesh with gear 19, which in turn is in mesh with gear 20, the electrodes are rotated at a uniform rate so as to maintain satisfactory electrical contact with the article being welded.

In Figs. 14 and 15, the electrodes shown at $15^a$ and $16^a$ are shaped so as to maintain uniform electrical connection with the article being welded. Moreover, the diameter of each electrode is such that the entire length of the seam cleft shall be traversed upon approximately one revolution of the electrodes. The relation of the electrodes to each other when viewed from the front of the machine is as shown in Fig. 16.

In certain cases the work to be welded is comparatively short. Accordingly the electrodes may have a circular segmental shape as indicated at 81ª in Figs. 16 and 17 and at 15ᵇ and 16ᵇ respectively in Figs. 18 and 19, but the shape of the contacting edges might be termed "irregular" in order to assure adequate electrical contact with an irregularly shaped article.

With the apparatus just described, the article to be welded is first formed into two cooperating sections which are then laid in the work holder with the seam cleft between the two electrodes. Under such conditions the work holder is near one end of the bed frame so as to be accessible for enabling the operator to position the work therein. Assuming that the article to be welded is the first of a large number having the same shape and characteristics, then after positioning the work within the holder the operator turns the handle 47 until the work is forced against the electrodes with the proper degree of pressure. If the pressure is not sufficient for the purpose desired, then pressure rolls positioned near the throat may be employed for pressing the edges of the seam cleft together in the usual way. Such rolls of necessity must be especially shaped along the contacting edges to conform to the article being welded. After the proper degree of pressure is obtained, then the motor 60 is started, and the welding current is turned on. In Fig. 8 I have shown a wiring diagram wherein the primary winding indicated at 70 has one lead 71 extending directly to the source of supply and another lead 72 which is electrically connected to a rheostat indicated in general at 73. This rheostat functions to vary the volume of current flowing in the primary circuit, and is electrically connected as at 74 to the source of supply. The work then progresses between the electrodes with the current on until the end of the stroke is reached, at which time the current is turned off and the motor 60 is stopped. To effect such control automatically, I have merely indicated circuit controllers 76 and 77 at each end of the frame. These circuit controllers may carry arms 78 and 79 respectively which are disposed within the path of an arm 9 on the carriage.

In welding certain hollow irregularly shaped articles such as boiler tubes which are curved adjacent their ends, it is necessary to vary the volume of current since the work moves in a straight line path at a fixed rate, wherefore it is necessary to weld a seam cleft which is longer than the distance between the two end points of the curve when measured in a straight line along the direction of travel. A satisfactory way of varying this current is illustrated in Figs. 5 and 8, wherein the screw shaft 39 is shown as being directly connected as by a chain 96 to a shaft 91. This shaft as indicated in Fig. 8 is electrically connected to an arm 92 which in turn moves across a set of contacts. These contacts control the volume of current in the primary circuit flowing by reason of the spaced resistance units 93. These spaced resistance units may of course be selectively connected in order to suit the work requirements. In certain cases, reactance units (not shown) may be used instead of resistance units.

The mechanism just described embodies the use of a single pair of electrodes between which the work passes, and against which pressure may be exerted by raising the carriage slightly prior to the welding operation. A machine operating in this manner is sufficient to weld a single seam on an irregularly shaped article. To permit welding on a double seam at one operation, I have shown in Figs. 6 and 7, a machine having a double pair of electrodes 80 and 81, which are shown as being mounted upon shafts 17ª and 18ª respectively. These shafts may be rotated in the same manner as those shown in Figs. 1 to 4. Moreover, the carriage may be adjusted for slight vertical movement with reference to the frame in the same manner as that heretofore described. The work holder however, is shown as being slightly modified, in that there is provided a bottom supporting block 82 and an upper block 83, one end of which may be hinged as at 84 to the lower block and the other end of which may be fastened as by a latch 85 to the lower block.

To effect proper lateral adjustment of the electrodes with relation to the work, I have shown an auxiliary frame 86 in Figs. 6 and 7, which supports the electrode shafts, and which may have slots for enabling a slight lateral shifting of the shafts to be accomplished. In this way I can attain the proper degree of contact pressure laterally against the work before the shafts are securely fastened in place. Moreover, adjusting screws 87 and 88 may be employed for preventing the shafts from being sprung out of position during the welding operation.

In the preferred form I employ a reversible motor for actuating the screw shaft, and I reverse the motor when the work holder has reached the end of the stroke. In welding certain articles which have only one seam to be welded, the article is placed in the holder at one end of the machine and is removed at the opposite end. Then another article is placed in the holder, the motor is reversed and the work is passed in the opposite direction between the electrodes. In this way, work may be fed into the holder at each end of the machine, so as to prevent idle movement of the carriage during a complete stroke. In the welding of other articles, particularly those having two opposed seams, the work is passed between the electrodes and welded along one seam, and is turned over in the holder so as to present the other seam to the electrodes, and then the carriage and holder are passed in the opposite direction between the electrodes. Under such conditions work is fed into and removed from the holder at the same end of the machine.

The method of electric welding as set forth herein is advantageous in that it is adapted for effecting a satisfactory weld on irregularly shaped hollow articles with a speed approximating that of electric tube welding machines. Moreover the particular characteristics of the weld are such that little or no fin is left upon the metal while a seam having sufficient mechanical strength may be obtained. The apparatus which I have shown conforms to the accepted practice of electric seam welding machines and can be readily made by those skilled in the art. Moreover, by varying the shape of each set of electrodes as well as that of the work holder, it is possible to maintain sufficient electrical contact with the work while the electrodes rotate on a fixed axes and the work moves in a straight line path between the electrodes. In addition, the flexible conductors employed in the secondary of the transformers obviates the necessity for the use of unsatisfactory sliding or fluid contacts.

Having thus described my invention, I claim:—

1. An electric welding machine comprising in combination a frame, a carriage associated therewith, a screw shaft operatively connected with the carriage, means for rotating the screw shaft so as to effect movement of the carriage with reference to the frame, a work holder mounted on the carriage and adjustable vertically with reference thereto, a pair of electrodes mounted on opposite sides of the work holder, there being space at each end of the frame for enabling work to be passed into or removed from said holder at the end of each stroke of the carriage.

2. An electric seam welding machine comprising in combination a frame, a transformer mounted above the frame said transformer having primary and secondary windings, a work holder mounted for reciprocating on the frame, a pair of electrodes oscillatably mounted on said frame on opposite sides of the work-holder, flexible conductors connecting the secondary winding of said transformer to the respective electrodes, said conductors having sufficient length to permit a predetermined degree of oscillation of each electrode, means for reciprocating said work holder and other means for effecting vertical adjustment of the holder with reference to the electrodes.

3. An electric seam welding machine comprising in combination a frame, a pair of electrodes, an electrical circuit therefor, a work holder, means for reciprocating the work holder with reference to the frame, means adjacent each end of the path of travel of the holder for controlling the flow of current in said circuit, other means adjacent each end of the frame for automatically stopping reciprocation of said holder after the work has passed out of engagement with said electrodes.

4. An electric seam welding machine comprising in combination a frame, a pair of electrodes associated therewith a carriage, means associated with the frame for reciprocating the carriage, a work holder removably positioned upon the carriage, means for moving the work holder independently of the carriage to vary the pressure between the work and said electrodes.

5. An electric welding machine comprising in combination a double pair of electrodes and having one pair on one shaft and another pair on a different shaft, means for rotating said shafts at a uniform rate, and means for moving an article to be welded between all of said electrodes whereby two seams may be welded at one operation.

6. An electric seam welding machine comprising in combination, a frame, a pair of rotatable electrodes thereon, an electrical circuit for said electrodes, a work holder carried by the frame, means for rotating the electrodes, means for moving the holder with relation to the electrodes, and current control means acting to vary the volume of current in said circuit in a predetermined manner during the welding operation.

7. In an electric welding machine, the combination of a frame, a work holder mounted thereon, a pair of rotary electrodes carried by the frame and having contacting surfaces shaped to conform to the contour of an irregularly shaped article mounted in said work holder, an electric circuit for said electrodes, and means acting to vary the volume of current flowing through said circuit in accordance with the surface variations of the article being welded.

8. A seam welding machine comprising in combination, a frame, a pair of rotatable electrodes mounted thereon, a work holder movable along the frame, an electric circuit for the electrodes, and means in said circuit for varying the voltage between the electrodes in a predetermined manner, during the welding operation.

9. In a machine for electrically welding hollow metallic articles having an irregular contour along the seam cleft comprising in combination, a frame, a pair of rotatable electrodes carried thereby and mounted on fixed axes, a work holder also mounted on the frame, said electrodes being adapted to engage an article in said holder adjacent the seam cleft, and having contacting surfaces being shaped to insure substantially uniform contact with the article being welded progressively throughout the length thereof, while the electrodes are rotated.

10. An electric seam welder comprising in combination, a frame, a work holder thereon, two pairs of electrodes, a work holder carried by the frame, one member of each pair being disposed in opposite sides of the work holder, an electrical circuit for said electrodes, said electrodes functioning to progressively and simultaneously weld seams on opposite sides of an article in said work holder.

11. A machine for electrically welding irregularly shaped hollow metallic articles comprising in combination, a frame, a work holder mounted thereon, a pair of electrodes associated with the frame and having the work contacting surfaces thereof adapted to engage articles to be welded on each side of the seam cleft, the contacting surfaces of the electrodes being shaped to conform to the longitudinal and transverse variations of the surface contour of the article being welded adjacent the seam cleft, for enabling uniform electrical contact to be maintained with the article throughout the length thereof while the article is moved in a straight line path between the electrodes, and an electrical circuit for said electrodes.

12. An electric seam welding machine comprising in combination, a frame, a work holder mounted thereon, electrodes carried by the frame, said work holder being adapted to hold irregularly shaped articles to be welded, an electrical circuit for the electrodes, said electrodes having irregularly shaped contacting surfaces, the electrodes being mounted for rotation on the frame on relatively fixed axes, and the contour of the contacting surfaces of said electrodes acting to maintain a uniform pressure on the article being welded over a predetermined length of irregular surface.

13. A seam welding machine comprising in combination, a frame, rotatable electrodes carried thereby, an electric circuit for said electrodes, a work holder mounted on the frame, means for actuating the work holder to pass work between the electrodes, and current control means in said circuit adapted to be actuated when the work reaches a predetermined point with reference to the electrodes for varying the volume of current in said circuit, said current control means being operatively connected with the work holder.

14. A seam welding machine comprising in combination, a frame, a pair of rotatable electrodes carried thereby, an electric circuit for said electrodes, a work supporting carriage associated with the electrodes, and means for reciprocating the carriage, said means having mechanism associated therewith for varying the volume of current in said circuit in a predetermined manner.

15. An electric seam welding machine, comprising in combination, a bed frame having a central opening adjacent the tops thereof, an auxiliary frame mounted within said opening, a carriage associated with the auxiliary frame, means for reciprocating said carriage along the auxiliary frame, other means for moving the auxiliary frame vertically with reference to the bed frame, a work holder mounted on the carriage, electrodes carried by the bed frame, and an electrical circuit for said electrodes, said carriage acting when in operation to position work with reference to the electrodes during the welding operation.

16. In an electric seam welder, a roller electrode having a contacting surface, the radii of which in any plane through the electrode and at right angles to the axis thereof, are of varying lengths so as to contact with articles to be welded which have an undulating or irregular surface.

17. An electric welding machine, comprising in combination, a frame, a pair of electrodes mounted for oscillation thereon, a carriage movably mounted on the frame, a work holder mounted on the carriage and adapted to be moved vertically with reference thereto, a screw and nut couple for actuating the carriage whereby work on the holder is moved past the electrodes, mechanism associated with the frame for actuating said couple, and other mechanism associated with the frame for selectively varying the vertical position of the holder with reference to the carriage.

In testimony whereof, I hereunto affix my signature.

HORACE P. SAILOR.